United States Patent
Posch et al.

(10) Patent No.: US 7,585,911 B2
(45) Date of Patent: Sep. 8, 2009

(54) MINERAL FILLED POLYETHYLENE FOR INNER LINERS

(75) Inventors: Werner Posch, Enns (AT); Stefan Schiesser, Leonding (AT); Ole Jan Myhre, Porsgrunn (NO)

(73) Assignee: Borealis Technology Oy, Porvoo (FI)

( * ) Notice: Subject to any disclaimer, the term of this patent is extended or adjusted under 35 U.S.C. 154(b) by 92 days.

(21) Appl. No.: 11/793,694

(22) PCT Filed: Dec. 20, 2005

(86) PCT No.: PCT/EP2005/013721

§ 371 (c)(1),
(2), (4) Date: Aug. 30, 2007

(87) PCT Pub. No.: WO2006/066883

PCT Pub. Date: Jun. 29, 2006

(65) Prior Publication Data

US 2008/0146714 A1 Jun. 19, 2008

(30) Foreign Application Priority Data

Dec. 23, 2004 (EP) .................................. 04030550

(51) Int. Cl.
*C08K 3/30* (2006.01)
(52) U.S. Cl. ...................................................... 524/423
(58) Field of Classification Search ................... 524/423
See application file for complete search history.

(56) References Cited

U.S. PATENT DOCUMENTS

| | | | | |
|---|---|---|---|---|
| 6,164,739 | A * | 12/2000 | Schulz et al. | 312/406 |
| 6,274,684 | B1 * | 8/2001 | Loveday et al. | 526/114 |
| 6,359,072 | B1 | 3/2002 | Whaley | |
| 6,552,150 | B1 * | 4/2003 | Nummila-Pakarinen et al. | 526/352 |
| 2004/0132933 | A1 | 7/2004 | Crowther et al. | |

FOREIGN PATENT DOCUMENTS

| | | |
|---|---|---|
| DE | 19712140 | 9/1998 |
| WO | WO-96/20977 | 7/1996 |

* cited by examiner

*Primary Examiner*—Ling-Siu Choi
*Assistant Examiner*—Hui Chin
(74) *Attorney, Agent, or Firm*—Jordan and Hamburg LLP

(57) ABSTRACT

Inner liners of foam insulated refrigerators and freezers are made of mineral filled bimodal polyethylene.

11 Claims, No Drawings

MINERAL FILLED POLYETHYLENE FOR INNER LINERS

BACKGROUND OF THE INVENTION

The present invention concerns the use of a mineral filled bimodal polyethylene (PE) for making inner liners of foam insulated refrigerators and freezers.

It is known to prepare inner liners of cabinets of household refrigerators and freezers by using polystyrene (PS), blends of PS with other polymers or coated PS-materials. The insulation layer of such devices generally consists of polyurethane (PU) foam which fills the space between their inner liner and their housing. In order to ensure the foam's good adhesion surface modification of the shell material is generally necessary.

DE-A-19712140 discloses a method for producing a refrigerator or freezer cabinet whose inner and outer shells are thermoformed from a single sheet of material whereby a seamless transition between inner and outer shell is provided. The material is a coextruded platine which consists of a polystyrene layer covered with a layer made of a polystyrene-polyethylene blend.

Such polystyrene based materials offer a good thermoformability, a low shrinkage factor and a good scratch resistance as well as good gloss properties, but are prone to environmental stress cracking. Environmental stress cracking (ESC) is the premature cracking of a polymer material due to the combined action of stress and a fluid. The need for regular cleaning of a refrigerator's inner compartment leads to the inner liner's deterioration by ESC as detergents promote the material's crazing and solvent plasticization. Areas around the inner liners' holes, which are necessary for the foaming process in order to allow the escape of propellants, are most susceptible to ESC as they offer fluids and detergents the opportunity to enter the insulation layer and to attack both surfaces of the liners' material.

In the course of thermoforming of inner liners large parts must be heated rather evenly, a procedure which requires a broad processing window of the material in order to minimize waste production. So far, PE is not suited for thermoforming inner liners, as the material has a narrow processing window which is technically difficult to provide for parts of the needed dimensions.

SUMMARY OF THE INVENTION

Unexpectedly, it was found that PE, if it is a bimodal PE and if it is mineral filled, can be used for making inner liners of foam insulated refrigerators and freezers. Such mineral filled bimodal PE can be processed, due to its large processing window, using the same equipment as in polystyrene-based liner production. It shows no ESC and has excellent adhesion to PU foam. The inner liners show low shrinkage, good scratch resistance and good gloss properties as well as no stress whitening and no appearance of streaks when coloured.

The object of the present invention therefore is the use of mineral filled bimodal polyethylene (PE) for making inner liners of foam insulated refrigerators and freezers.

DETAILED DESCRIPTION OF THE INVENTION

The bimodal PE has a weight average molecular weight $M_w$ of from 90,000 to 45,000 g/mol, preferably of from 150,000 to 400,000 g/mol, and a molecular weight distribution MWD, defined as the ratio of the weight average molecular weight $M_w$ to the number average molecular weight $M_n$, of from 5 to 40, preferably of from 7 to 30, a melt flow rate $MFR_2$ in the range of from 0.05 to 4.0 g/10 min, preferably of from 0.1 to 0.8 g/10 min, a melt flow rate $MFR_{21}$ of from 7 to 200 g/10 min, preferably of from 15 to 70 g/10 min, a flow ratio $FFR_{21/2}$, defined as the ratio of $MFR_{21}$ to $MFR_2$, of from 40 to 180, preferably of from 60 to 120, a density of from 912 to 960 kg/m$^3$, preferably of from 918 to 955 kg/m$^3$, and a comonomer content of from 0.5-20 wt %. $MFR_2$ is measured at 190° C. using a 2.16 kg weight, $MFR_{21}$ is measured at 190° C. using a 21.6 kg weight, according to ISO 1133.

The bimodal PE is a polyethylene containing a relatively high molecular weight fraction and a relatively low molecular weight fraction. It comprises from 30 to 70 wt %, preferably from 35 to 55 wt %, based on the weight of the bimodal PE, of a low molecular compound, and from 70 to 30 wt %, preferably from 65 to 45 wt %, based on the weight of the bimodal PE, of a high molecular weight component.

The low molecular weight component has an $MFR_2$ of from 10 to 1000, preferably of from 50 to 500 g/10 mm, more preferably of from 100 to 400 g/10 mm. The low molecular weight component can be a PE-homopolymer, having a density higher than 965 kg/m$^3$, preferably higher than 970 kg/m$^3$. Being a PE copolymer, its density is higher than 930 kg/m$^3$, preferably higher than 940 kg/m$^3$. A PE-copolymer's comonomer content is from 0.5 to 10 wt %, preferably of from 0.8 to 5 wt %, based on the weight of the low molecular weight component. The comonomers can be $C_3$-$C_8$ alpha-olefins, such as 1-propene, 1-butene, 1-pentene, 1-hexene, 4-methyl-1-pentene, 1-heptene and 1-octene, 1-butene or 1-hexene being preferred. The high molecular weight component's molecular weight is higher than the low molecular weight component's and it contains more comonomer than the low molecular weight component. It has such a molecular weight and comonomer content that at a given split of the components, the bimodal polyethylene composition has the desired melt index and density and an overall comonomer content of 0.5 to 20 wt %, based on the weight of the bimodal PE. The comonomers of the high molecular weight component can be $C_3$-$C_8$ alpha-olefins, such as 1-propene, 1-butene, 1-pentene, 1-hexene, 4-methyl-1-pentene, 1-heptene and 1-octene, 1-butene or 1-hexene being preferred. The bimodal PE for making inner liners is mineral filled. The mineral fillers are solid substances in a fine powdery form, being for example kaolin, wollastonite, magnesium hydroxide, chalk, different clays, talcum, silica, barium sulphate, mica etc. Among these fillers talcum and chalk are especially preferred. Any kind of talcum can be used, including compacted talcum. The particle size can vary to a great extent between 0.01 μm to 70 μm, usually being about 20 μm. The amount of fillers ranges from 10 to 60 wt %, the lower limit preferably being 20 wt %, more preferably being 30 wt %, and the preferred upper limit being 50 wt %, based on the weight of the mineral filled bimodal PE.

The bimodal polyethylene composition can be produced by any of the methods for production of bimodal polyethylene, for example in situ by polymerising or copolymerising ethylene in a reactor cascade formed by at least a first reactor and a second reactor in the presence of a polymerisation catalyst. For example, the reactor cascade can be a loop reactor and a subsequent gas phase reactor, or it can be a cascade of slurry tank reactors. After the polymer is collected from the reactor and the hydrocarbon residues are removed therefrom, the polymer is compounded and extruded to pellets.

Various types of additives like slipping agents, stabilisers, dyes, processing stabilisers, primary and secondary antioxidants, coupling agents, metal desactivators can be added.

Compounding can be done with devices like internal mixers or single- and twin-screw extruders, the latter being preferred. It may be of a co-rotating type, such as those produced by Japan Steel Works, having a designation JSW CIM-P, e.g. CIM90P, having a 90 mm screw diameter. It is especially preferred to use a counter-rotating twin screw extruder. The particulate filler may be added to the bimodal PE composition at this extrusion stage or in a separate step or directly after the polymerisation step.

The term "inner liner" comprises the inner compartment of refrigerators as well as the door liner. For production of the inner liner the thus obtained compound is extrusion moulded or calendered to sheets. If additional features like special surface conditions, gloss or surface effects are desired for the side which is going to face the inner compartment of the refrigerator, coatings conferring such characteristics can be coextruded. As the foam facing side shows an excellent adhesion to PU-foam, no further surface modification or coating is necessary. The sheets have a thickness of from 100 to 5000 µm, preferably of from 250 to 4500 µm and most preferably of from 1000 to 4000 µm. The platines for thermoforming are dimensioned in thickness and/or in size to provide a liner thickness after thermoforming from 300 to 1000 µm, preferably 500 to 900 µm.

The same equipment as in polystyrene based liner production can be used due to similar processing parameters of the mineral filled bimodal polyethylenes. The inner liner can be produced within a broad processing window which is a further advantage. The size of the window depends on the nature of the employed polymer, the nature of the mineral filler, the processing time and the type of equipment. Usually the processing window is 30° C., but it can also be broader. Liners are produced by vacuum draw down thermoforming.

EXAMPLES

Sheets were manufactured from compositions 1-5 and thermoformed on a Keifel one station or on a Keifel two station thermoforming machine to produce inner liners. The inner liner tool was made of aluminium. The water temperature of the tool was controlled, the tool water temperature set at 85° C. The frame oil temperature was set at 110° C. The heat pattern consisted of initial setting of even heat distribution with 10% extra heating in the flange area. The valves settings were: vacuum 50%, air 40% open.

To obtain different compositions, bimodal PE was compounded with different kinds and amounts of fillers and additives. The bimodal PE had a weight average molecular weight $M_w$ of 230000, a molecular weight distribution $M_w/M_n$ of 18, a melt flow rate $MFR_2$ of 0.2 g/10 min, a melt flow rate $MFR_{21}$ of 20 g/10 min, and a density of 931 kg/m$^3$.

Composition 1: Bimodal PE containing 30 wt % talcum.

Composition 2: Bimodal PE containing 35 wt % talcum as well as stabilisers.

Composition 3: Bimodal PE containing 40 wt % chalk as well as stabilisers.

Composition 4: Bimodal PE containing 35 wt % talcum as well as 0.1 wt % slip agent, 3.5 wt % white colour master batch, and stabilisers.

In the following examples, various compositions were moulded to inner liners.

Example 1

Thermoforming of inner liners of a refrigerator's inner compartment.

TABLE 1

Thermoforming conditions and properties of thermoformed inner liners

| Composition | Cycle time (s) | Initial heat setting (° C.) | Blow (s) | Hole Formation at corners | Defined shape of flanges | Demoulding without stress whitening | Fin formation |
|---|---|---|---|---|---|---|---|
| 1 | 355 | 145 | 2.7 | No | Yes | Yes | No |
| 1 | 330 | 145 | 2.7 | No | Yes | Yes | No |
| 2 | 345 | 147 | 2.7 | No | Yes | Yes | No |
| 2 | 348 | 147 | 2.7 | No | Yes | Yes | No |
| 3 | 354 | 145 | 3.0 | No | Yes | Yes | No |
| 4 | 350 | 147 | 2.7 | No | Yes | Yes | No |
| 4 | 382 | 147 | 2.7 | No | Yes | Yes | No |
| 4 | 368 | 148 | 2.7 | No | Yes | Yes | No |

The inner liners obtained according to Table 1 showed no hole formation, defined shape of flanges, easy demoulding without stress whitening in strain areas and no fin formation, and were approved.

Example 2

An inner liner of a refrigerator door was thermoformed from sheets made of Composition 4 on a Keifel two station thermoforming machine. The temperature at different positions of the platine was between 140 and 165° C. Thermoforming of the platine resulted in an inner liner without holes, with a defined shape of flanges and no fin formation, easy demoulding being possible without stress whitening in strain areas.

The invention claimed is:

1. Inner liners of foam insulated refrigerators and freezers, comprising mineral filled bimodal polyethylene, wherein the content of the mineral filler is from 20 wt % to 60 wt %, relative to the weight of the bimodal polyethylene.

2. Inner liners according to claim 1, wherein the bimodal polyethylene has a weight average molecular weight $M_w$ of from 90,000 to 450,000 g/mol, a molecular weight distribution $M_w/M_n$ of from 5 to 40, a melt flow rate $MFR_2$ of from 0.05 to 4.0 g/10 mm, a melt flow rate $MFR_{21}$ of from 7 to 200 g/10 mm, a flow ratio $FFR_{21/2}$ of from 40 to 180, and a density of from 912 to 960 kg/m$^3$.

3. Inner liners according to claim 1, wherein the bimodal polyethylene comprises (in) from 30 to 70 wt %, based on the weight of the bimodal polyethylene, of a low molecular weight component having a MFR$_2$ of from 10 to 1,000 g/10 min, and a density higher than 930 kg/m$^3$, and (ii) from 70 to 30 wt %, based on the weight of the bimodal polyethylene, of a high molecular weight component which is a polyethylene copolymer having such a molecular weight and comonomer content that at a given split of the components, the bimodal polyethylene has the desired melt index and density.

4. Inner liners according to claim 3, wherein the low molecular weight component is a polyethylene homopolymer having a melt flow rate MFR$_2$ of from 100 to 500 g/10 min, and a density higher than 965 kg/m$^3$.

5. Inner liners according to claim 3, wherein the low molecular weight component is a polyethylene copolymer having a MFR$_2$ of from 10 to 1000 g/10 min.

6. Inner liners according to claim 3 or claim 5, wherein the C$_3$-C$_8$ alpha-olefin as the comonomer.

7. Inner liners according to claim 6, wherein the C$_3$-C$_8$ alpha-olefin comonomer is present in an amount of 0.5 wt % to 20 wt %, based on the weight of the bimodal polyethylene.

8. Inner liners according to claim 3 or claim 5, wherein the polyethylene copolymer comprises 1-butene as the comonomer.

9. Inner liners according to claim 1, wherein the mineral filler comprises at least one selected from the group consisting of kaolin, wollastonite, magnesium hydroxide, chalk, different clays, talcum, silica, barium sulphate, mica and mixtures thereof.

10. Inner liners according to claim 1, wherein the mineral filler comprises talcum or chalk.

11. Inner liners according to claim 1, wherein the content of mineral fillers is 30 to 50 wt %, based on the weight of the mineral filled bimodal polyethylene.

* * * * *